(12) United States Patent
Ren et al.

(10) Patent No.: US 12,184,573 B2
(45) Date of Patent: Dec. 31, 2024

(54) SIGNAL COMMUNICATION METHOD AND DEVICE

(71) Applicant: DATANG MOBILE COMMUNICATIONS EQUIPMENT CO., LTD., Beijing (CN)

(72) Inventors: Bin Ren, Beijing (CN); Hui Li, Beijing (CN); Deshan Miao, Beijing (CN); Xiaotao Ren, Beijing (CN); Ren Da, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 336 days.

(21) Appl. No.: 17/640,212

(22) PCT Filed: Jul. 24, 2020

(86) PCT No.: PCT/CN2020/104658
§ 371 (c)(1),
(2) Date: Mar. 3, 2022

(87) PCT Pub. No.: WO2021/057232
PCT Pub. Date: Apr. 1, 2021

(65) Prior Publication Data
US 2022/0321294 A1 Oct. 6, 2022

(30) Foreign Application Priority Data
Sep. 29, 2019 (CN) .......................... 201910937200.2

(51) Int. Cl.
*H04L 5/00* (2006.01)
*H04W 64/00* (2009.01)

(52) U.S. Cl.
CPC ......... *H04L 5/0048* (2013.01); *H04W 64/003* (2013.01)

(58) Field of Classification Search
None
See application file for complete search history.

(56) References Cited

U.S. PATENT DOCUMENTS

| 2016/0095092 A1 | 3/2016 | Khoryaev et al. |
| 2016/0183044 A1 | 6/2016 | Wei et al. |
| | (Continued) | |

FOREIGN PATENT DOCUMENTS

| CN | 106341882 A | 1/2017 |
| CN | 106664518 A | 5/2017 |
| | (Continued) | |

OTHER PUBLICATIONS

LTE; Evolved Universal Terrestrial Radio Access (E-UTRA); Physical channels and modulation (3GPP TS 36.211 version 15.6.0 Release 15), 2019.

*Primary Examiner* — Hong Shao
(74) *Attorney, Agent, or Firm* — Meunier Carlin & Curfman LLC

(57) ABSTRACT

The present application discloses a signal transmission method and device that can achieve transmission of sidelink positioning reference signals so as to implement sidelink-based positioning. Embodiments of the present application provide a signal sending method used at a sending end, the method comprising: determining sidelink positioning reference signal (SPRS) resource configuration information of a first terminal on a sidelink; and sending, according to the SPRS resource configuration information, a SPRS to a second terminal via the sidelink, such that the second terminal performs positioning measurement on the basis of the SPRS.

20 Claims, 7 Drawing Sheets

(56) References Cited

U.S. PATENT DOCUMENTS

| | | | |
|---|---|---|---|
| 2017/0331670 A1 | 11/2017 | Parkvall et al. | |
| 2019/0230618 A1 | 7/2019 | Saur et al. | |
| 2019/0239181 A1 | 8/2019 | Gangakhedkar et al. | |
| 2020/0408871 A1* | 12/2020 | Da | G01S 1/20 |
| 2022/0039080 A1* | 2/2022 | Khoryaev | H04W 4/40 |

FOREIGN PATENT DOCUMENTS

| | | |
|---|---|---|
| CN | 110062457 A | 7/2019 |
| WO | 2016048510 A1 | 3/2016 |
| WO | 2018068817 A1 | 4/2018 |
| WO | 2019153129 A1 | 8/2019 |

* cited by examiner

SIGNAL COMMUNICATION METHOD AND DEVICE

CROSS-REFERENCE OF RELATED APPLICATIONS

The present application is a National stage of International Application No. PCT/CN2020/104658, filed on Jul. 24, 2020, which claims the priority from Chinese Patent Application No. 201910937200.2, filed with the Chinese Patent Office on Sep. 29, 2019 and entitled "Signal Communication method and Device", both of which are hereby incorporated by reference in their entireties.

FIELD OF INVENTION

The present application relates to the field of communication technologies, and particularly to a signal communication method and device.

BACKGROUND

The direct communication link (Sidelink) physical channel and the signal format defined in 4G Long Term Evolution (LTE) Proximity Communication Port 5 (PC5) are introduced as follows.

The basic conclusions about 4G LTE V2X (Vehicle To Everything) PC5 physical channel format are summarized as follows.

1. Contain 4 types of physical channels and physical signals as follows:
    Physical Sidelink Shared CHannel (PSSCH): a channel used to bear data; where the physical layer processing mechanisms such as encoding, rate matching and interleaving are the same as those of Device-to-Device (D2D);
    Physical Sidelink Control CHannel (PSCCH): a channel used to bear the control information and SA signaling; where the physical layer processing mechanisms such as coding, rate matching and interleaving are the same as those of D2D;
    Physical Sidelink Broadcast CHannel (PSBCH): used to bear the Sidelink broadcast information, where the physical layer processing mechanisms such as coding, rate matching and interleaving are the same as those of D2D;
    Sidelink Primary Synchronization Signal/Sidelink Secondary Synchronization Signal (PSSS/SSSS signal): used to synchronize Sidelink.

2. The PSCCH and PSSCH use 4 columns of Demodulation Reference Signal (DMRS) pilots, where the Orthogonal Frequency Division Multiplexing (OFDM) symbols occupied by the DMRS are {2, 5, 8, 11}.

3. Referring to FIG. 1, the basic design of Rel-12 D2D frame structure continues to be used in Rel-14 V2X, where the Transmission Time Interval (TTI) is 1 ms in length, one TTI contains two slots, the first symbol of a subframe is used to bear the service data, and the receiving end performs the Automatic Gain Control (AGC) adjustment on this symbol. The last symbol of the subframe is used as a Guard Period (GP), which uses the Puncture method for RE mapping.

The Sidelink physical channel and the signal format defined in 5G New Radio (NR) PC5 are as follows:
    Slot structure: AGC is in the front, GP is in the back, and TP is in the middle for power change, where the AGC and GP generally use 1 OFDM symbol, and may use 2 OFDM symbols when SubCarrier Spacing (SCS)=120 KHz.
    For the high-speed design, it supports a relative speed of up to 500 Kmph.
    Synchronization: Synchronization Subframe+Synchronization Block (SS/PBCH block, SSB).
    In addition to the four physical channels of LTE PC5, a Physical Sidelink Feedback Channel (PSFCH) is added to physical channels.
    In addition to the DMRS of LTE PC5, the CSI-RS and PT-RS are added to physical signals.

However, there is no positioning reference signal based on Sidelink positioning in the prior art. The use of the current CSI-RS, DMRS and SSB alone cannot meet the positioning performance indicators of Sidelink, because the DMRS can only coexist with data, the CSI-RS depends on the configuration, these two signals cannot be sent periodically as general positioning reference signals; the SSB exists in a single slot and the bandwidth is limited, and the accuracy of the timing measurement value as positioning cannot meet the requirement.

BRIEF SUMMARY

The embodiments of the present application provide a signal communication method and device, so as to realize the communication of a Sidelink positioning reference signal and thus realize Sidelink-based positioning.

At a transmitting end, a signal transmitting method provided in an embodiment of the present application includes:
    determining a Sidelink Positioning Reference Signal (SPRS) resource configuration information of a first terminal on a Sidelink;
    transmitting an SPRS to a second terminal through the Sidelink according to the SPRS resource configuration information, wherein the SPRS is used for the second terminal to perform a positioning measurement.

With this method, the SPRS resource configuration information of the first terminal on the Sidelink is determined, and the SPRS is sent to the second terminal through the Sidelink according to the SPRS resource configuration information, so that the second terminal performs the positioning measurement based on the SPRS, thereby realizing the transmission of the Sidelink positioning reference signal and thus realizing Sidelink-based positioning.

Optionally, the SPRS resource configuration information includes one or a combination of:
    an SPRS resource set, SPRS resources, an SPRS time domain structure, an SPRS frequency domain structure, or a sequence number of a slot for transmitting the SPRS to the second terminal.

Optionally, the SPRS resource set includes at least one of following characteristics:
    the SPRS resource set includes at least one SPRS resource, and all SPRS resources in the SPRS resource set are associated with an antenna array of a same terminal, or
    for new radio frequency bands FR1 and FR2, an identifier of each SPRS resource in the SPRS resource set is associated with an antenna array of a terminal.

Optionally, the SPRS resources include at least one of following characteristics:
    a comb factor Comb-N resource unit pattern of each of the SPRS resources is used to map an SPRS sequence to a Resource Element (RE) in frequency domain;

the SPRS resource is described by at least one of: an SPRS resource ID, a sequence ID, a Comb-N value, a RE offset, an initial slot index and symbol index of the SPRS resource, a quantity of symbols of each SPRS resource, or a quasi co-location information of Synchronization Block/PBCH (SSB);

the quantity of symbols of the SPRS resource is predefined by protocol or pre-configured on a network side, or the Comb-N value of the SPRS resource is pre-defined by protocol or pre-configured on a network side.

Optionally, the SPRS time domain structure supports two SPRS time domain structures as follows:

a single slot structure: AGC, SPRS and GP are placed in sequence from front to back in each slot;

a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:

a first frequency domain structure: a plurality of continuous REs occupy a full bandwidth, and different SPRS resources are distinguished by a comb pattern of REs at equal interval;

a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value of the SPRS frequency domain bandwidth is a maximum system bandwidth of the Sidelink.

Optionally, the SPRS resource configuration information is pre-defined by protocol or determined by signaling; where the signaling includes one or a combination of:

a broadcast signaling issued from a serving base station, a Downlink Control Information (DCI) signaling, a positioning dedicated signaling defined by Uu protocol of NR wireless air interface, or a positioning dedicated signaling of Proximity Communication Port PC5 protocol.

Correspondingly, at the receiving end, a signal receiving method provided in an embodiment of the present application includes:

determining an SPRS resource configuration information of a first terminal on a Sidelink, where the SPRS resource configuration information is sent by a second terminal;

receiving an SPRS sent by the second terminal through the Sidelink according to the SPRS resource configuration information.

Optionally, the method further includes:

measuring the SPRS to obtain a positioning measurement value;

determining relative distance information from the second terminal to the first terminal according to the positioning measurement value.

Optionally, the SPRS resource configuration information includes one or a combination of:

an SPRS resource set, SPRS resources, an SPRS time domain structure, an SPRS frequency domain structure, or a sequence number of a slot for receiving the SPRS sent by the second terminal.

Optionally, the SPRS resource set includes at least one of following characteristics:

the SPRS resource set includes at least one SPRS resource, and all SPRS resources in the SPRS resource set are associated with an antenna array of a same terminal, or for new radio frequency bands FR1 and FR2, an identifier of each SPRS resource in the SPRS resource set is associated with an antenna array of a terminal.

Optionally, the SPRS resources include at least one of following characteristics:

a comb factor Comb-N resource unit pattern of each of the SPRS resources is used to map an SPRS sequence to an RE in frequency domain;

the SPRS resource is described by at least one of: an SPRS resource ID, a sequence ID, Comb-N value, a RE offset, initial slot index and symbol index of the SPRS resource, a quantity of symbols of each SPRS resource, or a quasi co-location information of SSB;

the quantity of symbols of the SPRS resource is pre-defined by protocol or pre-configured on a network side, or the Comb-N value of the SPRS resource is pre-defined by protocol or pre-configured on a network side.

Optionally, the SPRS time domain structure supports two SPRS time domain structures as follows:

a single slot structure: AGC, SPRS and GP are placed in sequence from front to back in each slot;

a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:

a first frequency domain structure: a plurality of continuous REs occupy a full bandwidth, and different SPRS resources are distinguished by a comb pattern of REs at equal interval;

a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value of the SPRS frequency domain bandwidth is a maximum system bandwidth of the Sidelink.

Optionally, the SPRS resource configuration information is pre-defined by protocol or determined by signaling; where the signaling includes one or a combination of:

a broadcast signaling issued from a serving base station, a DCI signaling, a positioning dedicated signaling defined by Uu protocol of NR wireless air interface, or positioning dedicated signaling of Proximity Communication Port PC5 protocol.

A signal transmitting device provided in an embodiment of the present application includes:

a memory configured to store program instructions;
a processor configured to invoke the program instructions stored in the memory to perform the process of:
determining an SPRS resource configuration information of a first terminal on a Sidelink;
transmitting an SPRS to a second terminal through the Sidelink according to the SPRS resource configuration information, wherein the SPRS is used for the second terminal to perform a positioning measurement.

Optionally, the SPRS resource configuration information includes one or a combination of:

an SPRS resource set, SPRS resources, an SPRS time domain structure, an SPRS frequency domain structure, or a sequence number of a slot for transmitting the SPRS to the second terminal.

Optionally, the SPRS resource set includes at least one of following characteristics:

the SPRS resource set includes at least one SPRS resource, and all SPRS resources in the SPRS resource set are associated with an antenna array of a same terminal, or for new radio frequency bands FR1 and FR2, an identifier of each SPRS resource in the SPRS resource set is associated with an antenna array of a terminal.

Optionally, the SPRS resources include at least one of following characteristics:

a comb factor Comb-N resource unit pattern of each of the SPRS resources is used to map an SPRS sequence to an RE in frequency domain;

the SPRS resource is described by at least one of: an SPRS resource ID, a sequence ID, Comb-N value, RE offset, initial slot index and symbol index of the SPRS resource, a quantity of symbols of each SPRS resource, or quasi co-location information of SSB;

the quantity of symbols of the SPRS resource is pre-defined by protocol or pre-configured on a network side, or the Comb-N value of the SPRS resource is pre-defined by protocol or pre-configured on a network side.

Optionally, the SPRS time domain structure supports two SPRS time domain structures as follows:

a single slot structure: AGC, SPRS and GP are placed in sequence from front to back in each slot;

a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:

a first frequency domain structure: a plurality of continuous REs occupy a full bandwidth, and different SPRS resources are distinguished by a comb pattern of REs at equal interval;

a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value of the SPRS frequency is a maximum system bandwidth of the Sidelink.

Optionally, the SPRS resource configuration information is pre-defined by protocol or determined by signaling; where the signaling includes one or a combination of:

a broadcast signaling issued from a serving base station, a DCI signaling, a positioning dedicated signaling defined by Uu protocol of NR wireless air interface, or positioning dedicated signaling of Proximity Communication Port PC5 protocol.

A signal receiving device provided in an embodiment of the present application includes:

a memory configured to store program instructions;
a processor configured to invoke the program instructions stored in the memory to perform the process of:
determining an SPRS resource configuration information of a first terminal on a Sidelink, where the SPRS resource configuration information is sent by a second terminal;
receiving an SPRS sent by the second terminal through the Sidelink according to the SPRS resource configuration information.

Optionally, the processor is further configured to:
measure the SPRS to obtain a positioning measurement value;
determine relative distance information from the second terminal to the first terminal according to the positioning measurement value.

Optionally, the SPRS resource configuration information includes one or a combination of:

an SPRS resource set, SPRS resources, an SPRS time domain structure, an SPRS frequency domain structure, or a sequence number of a slot for receiving the SPRS sent by the second terminal.

Optionally, the SPRS resource set includes at least one of following characteristics:

the SPRS resource set includes at least one SPRS resource, and all SPRS resources in the SPRS resource set are associated with an antenna array of a same terminal, or for new radio frequency bands FR1 and FR2, an identifier of each SPRS resource in the SPRS resource set is associated with an antenna array of a terminal.

Optionally, the SPRS resources include at least one of following characteristics:

a comb factor Comb-N resource unit pattern of each of the SPRS resources is used to map an SPRS sequence to an RE in frequency domain;

the SPRS resource is described by at least one of: an SPRS resource ID, a sequence ID, Comb-N value, a RE offset, an initial slot index and symbol index of the SPRS resource, a quantity of symbols of each SPRS resource, or quasi co-location information of SSB;

the quantity of symbols of the SPRS resource is pre-defined by protocol or pre-configured on a network side, or the Comb-N value of the SPRS resource is pre-defined by protocol or pre-configured on a network side.

Optionally, the SPRS time domain structure supports two SPRS time domain structures as follows:

a single slot structure: AGC, SPRS and GP are placed in sequence from front to back in each slot;

a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:

a first frequency domain structure: a plurality of continuous REs occupy a full bandwidth, and different SPRS resources are distinguished by a comb pattern of REs at equal interval;

a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value is a maximum system bandwidth of the Sidelink.

Optionally, the SPRS resource configuration information is pre-defined by protocol or determined by signaling; where the signaling includes one or a combination of:

broadcast signaling issued from a serving base station, DCI signaling, positioning dedicated signaling defined by Uu protocol of NR wireless air interface, or positioning dedicated signaling of Proximity Communication Port PC5 protocol.

A signal transmitting device provided in an embodiment of the present application includes:

a determining unit configured to determine an SPRS resource configuration information of a first terminal on a Sidelink;

a transmitting unit configured to send an SPRS to a second terminal through the Sidelink according to the SPRS resource configuration information, wherein the SPRS is used for the second terminal to perform a positioning measurement.

A signal receiving device provided in an embodiment of the present application includes:

a determining unit configured to determine an SPRS resource configuration information of a first terminal on a Sidelink, where the SPRS resource configuration information is sent by a second terminal;

a receiving unit configured to receive an SPRS sent by the second terminal through the Sidelink according to the SPRS resource configuration information.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

Figure 1:
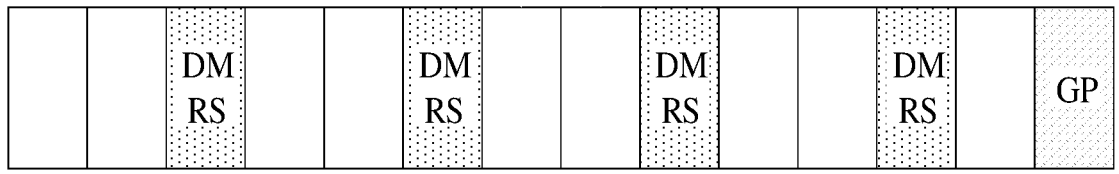
FIG. 1 is a schematic diagram of a frame structure of the PSCCH channel and PSSCH channel of LTE PC5 V2V.

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those ordinary skilled in the art without creative work pertain to the protection scope of the present application.

Some embodiments of the present application provide a signal communication method and device, so as to realize the communication of a Sidelink positioning reference signal and thus realize Sidelink-based positioning.

Here, the method and apparatus are based on the same application concept. Since the principle of solving the problem in the method is similar to that in the apparatus, the implementations of the apparatus and method can refer to each other, and the repeated description thereof will be omitted.

The technical solutions provided by the embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in the embodiments of the present application.

The network device involved in the embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, where the rest of the access network may include IP networks. The network device may further coordinate the attribute management of the air interface. For example, the network device involved in the embodiments of the present application may be a network device (Base Transceiver Station (BTS)) in the GSM or CDMA, or a network device (NodeB) in the Wideband Code Division Multiple Access (WCDMA), or an evolutional network device (evolutional Node B (eNB or e-NodeB)) in the LTE system, or a 5G base station in the 5G network architecture (next generation system), or a Home evolved Node B (HeNB), a relay node, a femto, a pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the technical solutions provided by the embodiments.

The embodiments of the present application proposes a method for transmitting and receiving a Sidelink-based PRS (SPRS for short), so as to locate the UE location based on Sidelink.

Figure 2:
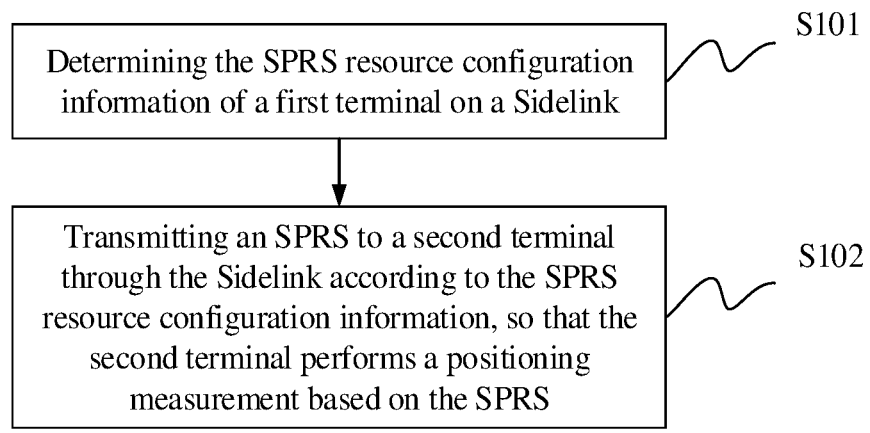
FIG. 2 is a schematic flowchart of a signal transmitting method according to an embodiment of the present application.

Referring to FIG. 2, at the transmitting end, for example at the side of Vehicle-to-Everything User Equipment #1 (V2X-UE1, V-UE1), a signal transmitting method provided in an embodiment of the present application includes the following steps.

S101: determining the SPRS resource configuration information of a first terminal on a Sidelink.

For example, the first terminal is V-UE1, which obtains the SPRS2 resource configuration information of the V-UE1 on the Sidelink through protocol predefinition or signaling, for transmitting an SPRS2 signal.

In the embodiment of the present application, the SPRS sent to the second terminal V-UE2 is called SPRS2, and the SPRS sent by V-UE2 to V-UE1 (that is, the SPRS received by V-UE1) is called SPRS1.

Here, the SPRS2 resource configuration information includes one or a combination of: an SPRS2 resource set, SPRS2 resources, an SPRS2 time domain structure, an SPRS2 frequency domain structure, and a sequence number n of a slot for transmitting the SPRS2 to other V-UE2.

The signaling may be broadcast signaling, Downlink Control Information (DCI) signaling or positioning dedicated signaling issued from a serving base station of Uu port, or positioning dedicated signaling of Proximity Communication Port PC5 protocol.

S102: transmitting an SPRS to a second terminal through the Sidelink according to the SPRS resource configuration information, so that the second terminal performs a positioning measurement based on the SPRS.

For example, according to the SPRS2 resource configuration information, V-UE1 sends an SPRS2 signal to V-UE2 in Slot #n, so that V-UE2 performs the positioning measurement based on the SPRS2 signal and calculates the relative distance information from V-UE1 to V-UE2.

Figure 3:
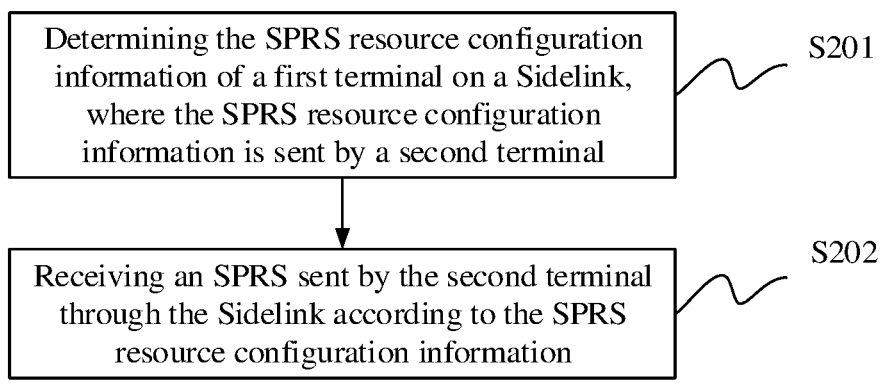
FIG. 3 is a schematic flowchart of a data receiving method according to an embodiment of the present application.

Correspondingly, at the receiving end, for example at the V-UE1 side, referring to FIG. 3, a signal receiving method provided in an embodiment of the present application includes followings.

S201: determining the SPRS resource configuration information of a first terminal on a Sidelink, where the SPRS resource configuration information is sent by a second terminal.

For example, the SPRS1 resource configuration information of the V-UE1 on the Sidelink from V-UE2 is obtained through protocol predefinition or signaling, for receiving the SPRS1 signal.

S202: receiving an SPRS sent by the second terminal through the Sidelink according to the SPRS resource configuration information.

For example, V-UE1 receives the SPRS1 signal sent by V-UE2 in Slot #m.

Here, the configuration information includes one or a combination of: an SPRS1 resource set, SPRS1 resources, an SPRS1 time domain structure, an SPRS1 frequency domain structure, and a sequence number m of a slot for receiving the SPRS1 from V-UE2.

Here, the signaling may be broadcast signaling, DCI signaling or positioning dedicated signaling issued from a serving base station of Uu port, or positioning dedicated signaling of PC5 protocol.

Optionally, the method further includes:
measuring the SPRS to obtain a positioning measurement value;
determining the relative distance information from the second terminal to the first terminal according to the positioning measurement value.

For example, the V-UE1 measures the SPRS1 signal to obtain positioning measurement values, including but not limited to Received Signal Strength (RSS), Time Of Arrival (TOA), and Angle Of Arrival (AOA), etc.

The V-UE1 calculates the relative distance information from V-UE2 to V-UE1 according to the above-mentioned positioning measurement values.

It should be noted that the SPRS signals (for example, the SPRS1 and SPRS2 described above) between different V-UEs may be Frequency Division Multiplexing (FDM), Code Division Multiplexing (CDM) or Time Division Multiplexing (TDM), and may be configured in two following ways: protocol predefinition and signaling configuration (broadcast signaling, physical layer DCI signaling and positioning dedicated signaling, Uu port configuration or PC5 configuration).

Except for V-UE1, all other UEs (for example: V-UE2) are applicable to any one of the above methods provided in the embodiments of the present application.

The SPRS signal design based on Sidelink is given below.

The Sidelink-based SPRS signal provided in an embodiment of the present application adopts a two-level structure of SPRS resource set and SPRS resource.

For example, for the NR Frequency Range 1 (FR1), an SPRS resource set configured by default contains only one SPRS resource, because the V-UE antenna array (Panel) contains a few number of antennas, especially the beam sweeping generally does not occur in FR1; for the NR Frequency Range 2 (FR2), the SPRS may perform beam scanning but not perform beam forming.

Regarding the SPRS resource set provided in the embodiment of the present application:
One SPRS resource set is a set containing SPRS resources, each of which has an SPRS resource ID, and all SPRS resources of an SPRS resource set are associated with the antenna array (i.e., Panel) of the same V-UE;
For the FR1 and 1-R2, one SPRS resource ID in one SPRS resource set is associated with a single antenna array sent from a single V-UE, and the V-UE may send one or more antenna arrays.

The difference between the SPRS of Sidelink and the PRS of Uu port is: the PRS of Uu port is associated with TRP, and the SPRS of Sidelink is associated with the antenna array of V-UE.

Regarding the SPRS resources provided in the embodiment of the present application:
The Comb Factor-N(Comb-N) resource unit pattern of each SPRS resource is used to map the SPRS sequence to a resource unit in the frequency domain, and the Comb-N pattern may be offset across SPRS symbols in the frequency domain;

The SPRS resource is described by at least the following parameters: SPRS resource ID, sequence ID, Comb-N value, RE offset, initial slot index and symbol index of the SPRS resource, a quantity of symbols of each SPRS resource (duration of SPRS resource), and Quasi-Co-Location (QCL) information of SSB;
The quantity of symbols of the SPRS resource is pre-defined by protocol or pre-configured on the network side, and for example, may be flexibly configured from the set $\{2, 4, 6\}$;
The Comb-N value of the SPRS resource is pre-defined by protocol or pre-configured on the network side, and for example, may be flexibly configured from the set $\{2, 4, 6\}$.

Regarding the SPRS time domain structure provided in the embodiment of the present application:
Two following SPRS time domain structures are supported:
Type 1 (single slot structure): AGC (including one or more OFDM symbols) is placed in the front section of a slot, GP (including one or more OFDM symbols) is placed at the end, and the number and locations of SPRSs in the middle are predefined by protocol or configured flexibly on the network side;
Type 2 (slot bundling structure): AGC (one or more OFDM symbols) is placed at the forefront of N continuous slots, GP (one or more OFDM symbols) is placed at the end, and the number and locations of SPRSs in the middle are predefined by protocol or configured flexibly on the network side.

Here, the Type2 is used by one V-UE to send the SPRS continuously in the broadcast mode, and multiple V-UEs are not allowed to use two continuous slots.

Figure 4A:
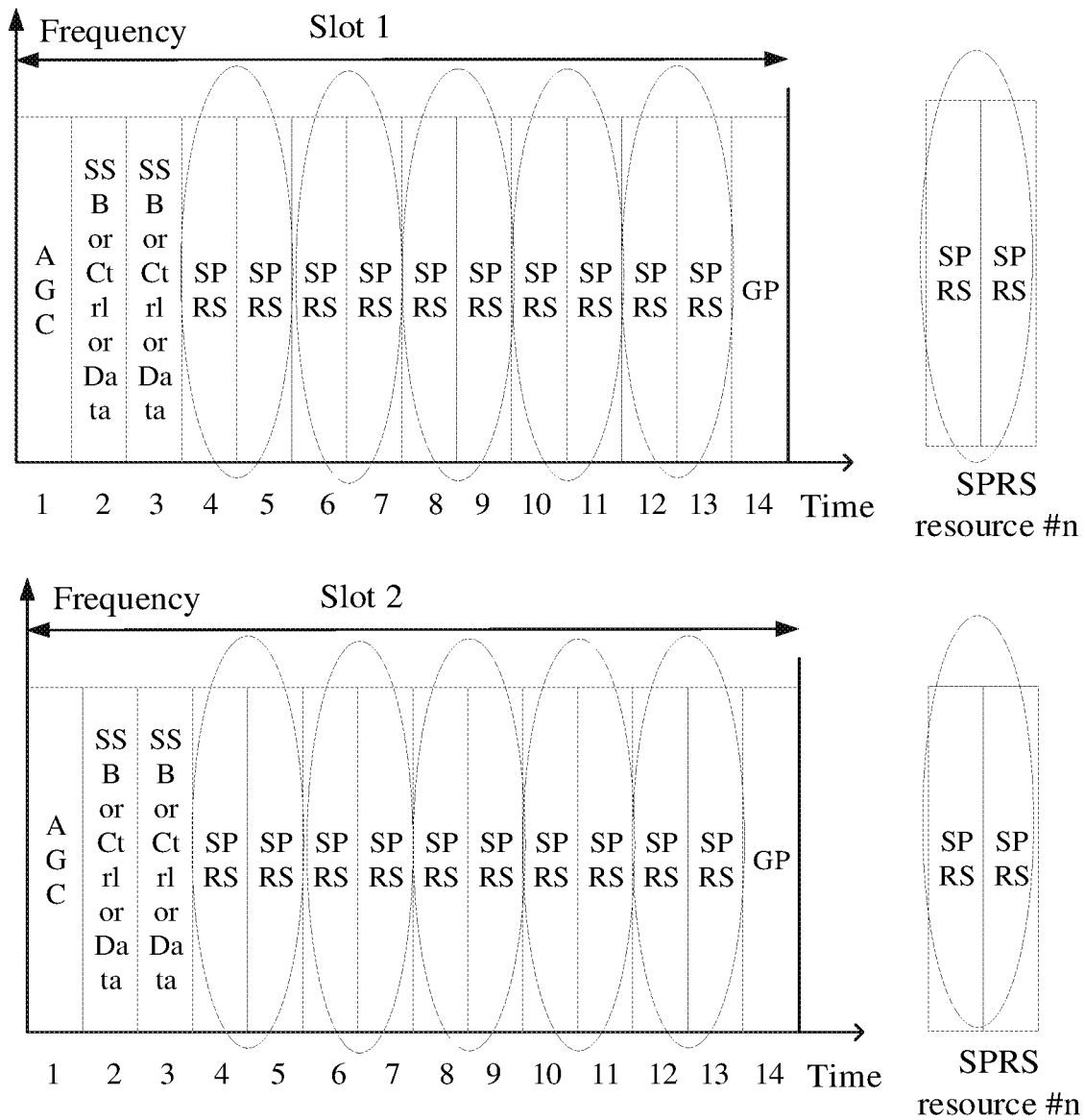
FIG. 4A is a schematic diagram of a time domain structure of a first type of SPRS according to an embodiment of the present application.
Figure 4B:
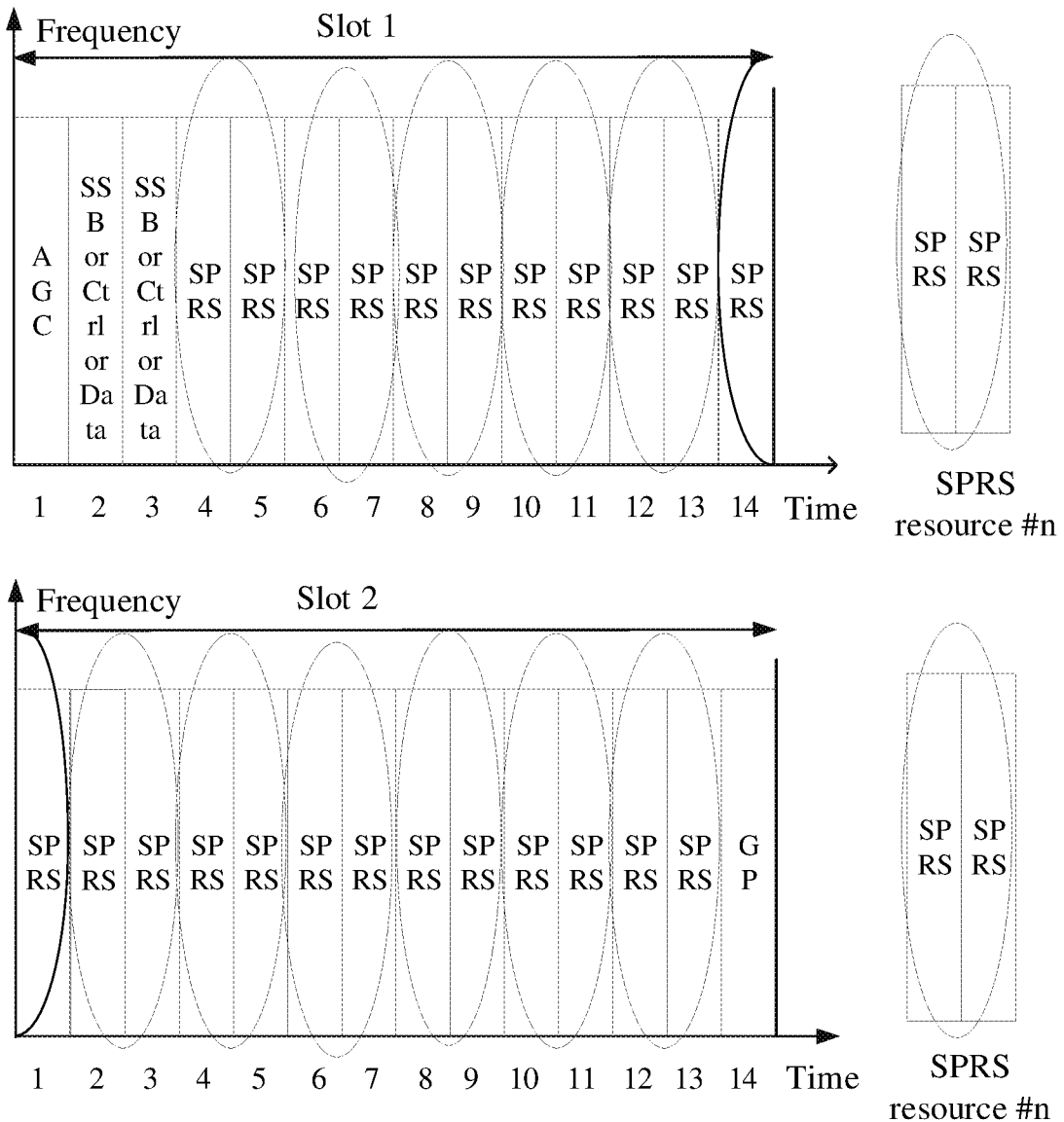
FIG. 4B is a schematic diagram of a time domain structure of a second type of SPRS according to an embodiment of the present application.

FIG. 4A and FIG. 4B show the two SPRSs time domain structures described above. In FIG. 4B, N=2, and the SPRS resources include 2 OFDM symbols.

Here, the number of OFDM symbols occupied by the SPRS in the time domain is configurable, and generally, a plurality of OFDM symbols are configured to support the V-UE to perform TOA, AoA, Doppler and other measurements.

Regarding the SPRS frequency domain structure provided in the embodiment of the present application:
The SPRS frequency domain bandwidth is pre-defined by protocol or configured on the network side, and the maximum value is the maximum system bandwidth of the Sidelink.

Two following SPRS frequency domain structures are supported.
First frequency domain structure (Pattern Type A): the continuous REs occupy the full bandwidth, and different SPRS resources are distinguished by way of Comb Factor-N (Comb-N);
Second frequency domain structure (Pattern Type B): the full bandwidth is divided into N different continuous sub-bands, and different SPRS resources occupy different sub-bands.

For the Type A, the Comb-N factor in the frequency domain is predefined by protocol or configured on the network side, including $\{1, 2, 4\}$, where the typical value of the number N_Tx of transmitting antennas of V-UE is 2 or 4, and different SPRS resources may be mapped to different transmitting antenna arrays. For example, when the V-UE has 4 transmitting antenna arrays, the antenna arrays are respectively mapped to different SPRS resources.

For the Pattern Type A and Type B, both support the fixed RE pattern and frequency hopping RE pattern.

Figure 5:
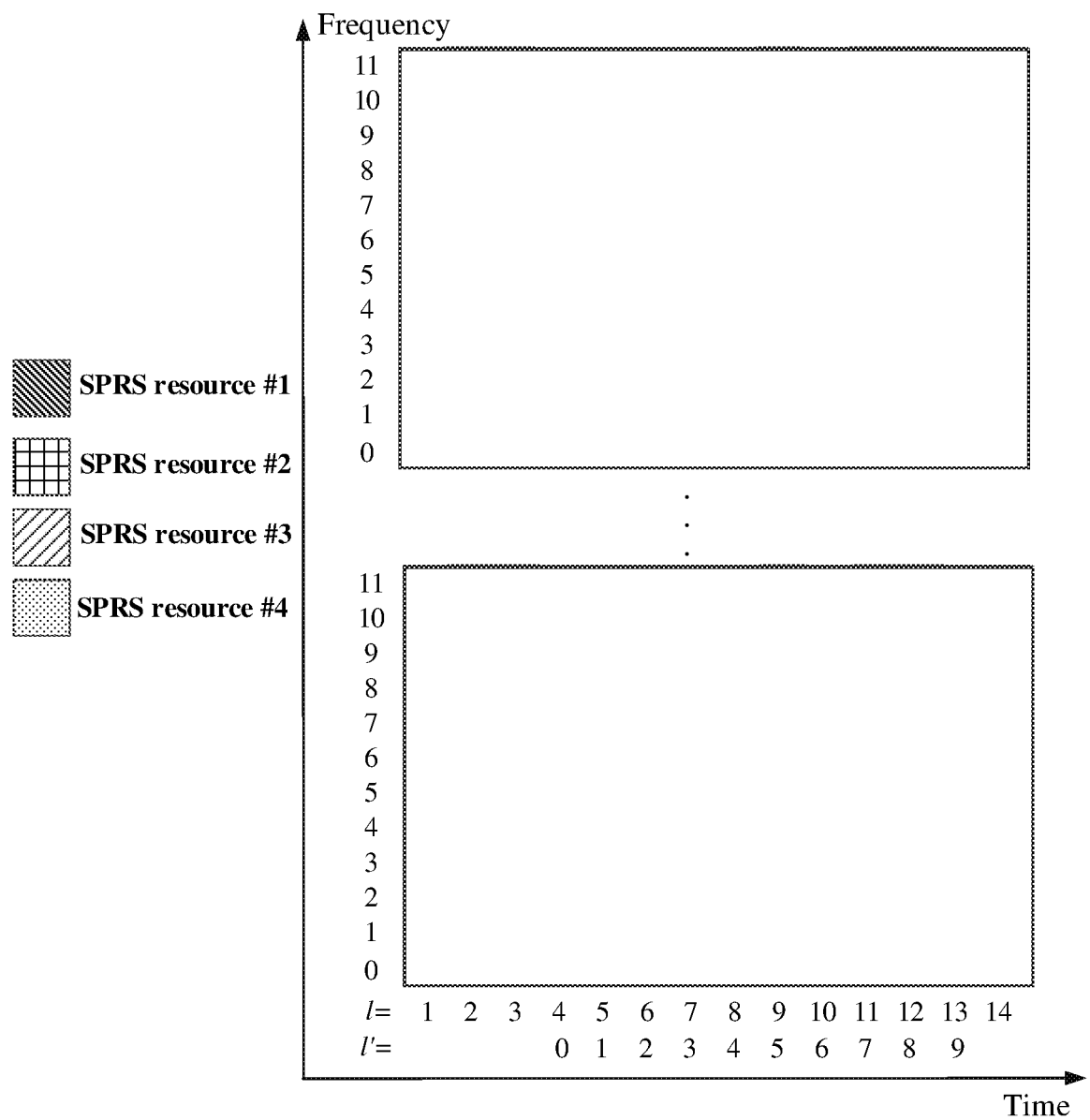
FIG. 5 is a schematic diagram of an SPRS signal pattern according to an embodiment of the present application.

FIG. 5 shows a schematic diagram of the Pattern Type A of the SPRS signal. The comb factor N (Comb-N) is equivalent to a frequency domain extraction factor, so that the subcarriers used by the same SPRS resource have a comb spectrum. In the first PRB shown in FIG. 5, the SPRS resources 1/2/3/4 use subcarriers 4*n+[0/1/2/3] respectively, where n=0, 1, 2 and 3. The SPRS resource 1 uses subcarriers 0, 4 and 8 with an interval of 4; the SPRS resource 2 uses subcarriers 1, 5 and 9 with an interval of 4; the SPRS resource 3 uses subcarriers 2, 6 and 10 with an interval of 4; and the SPRS resources 4 uses subcarriers 3, 7 and 11 with an interval of 4.

Figure 6:
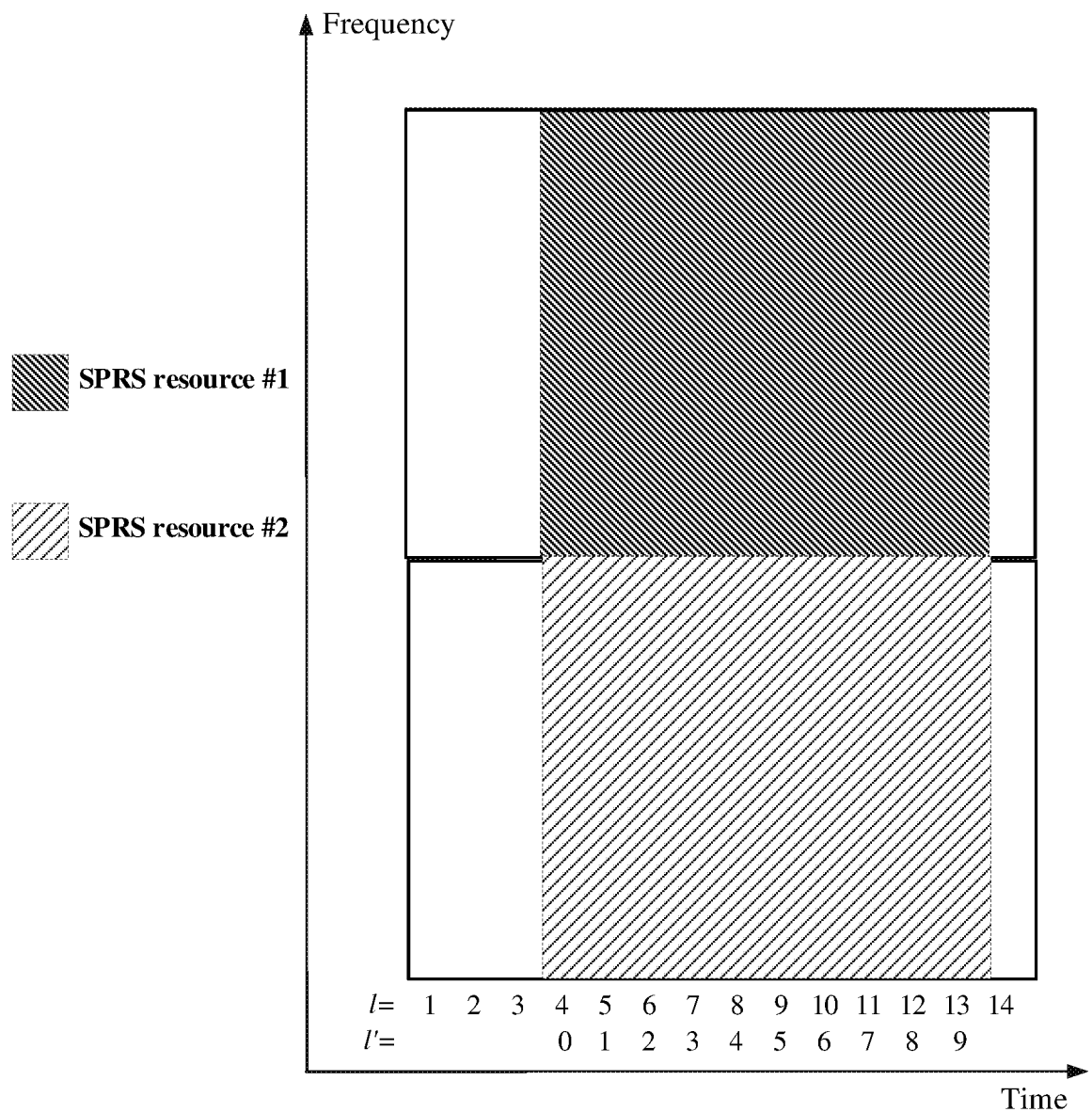
FIG. 6 is a schematic diagram of another SPRS signal pattern according to an embodiment of the present application.

FIG. 6 shows a schematic diagram of the Pattern Type B of the SPRS signal. Here, the entire bandwidth BW is divided into N=2 segments, and each PRS resource occupies a continuous segment of frequency band and may be frequency hopped.

The introduction of several specific embodiments will be given below.

Figure 7:
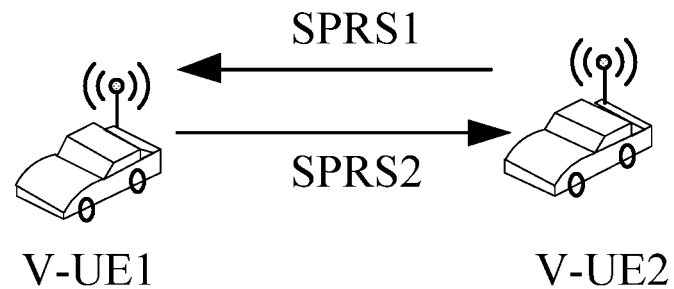
FIG. 7 is a schematic diagram of UE relative positioning from a vehicle-to-vehicle based on RSS according to an embodiment of the present application.

Embodiment 1: The Relative Positioning Based on the RSS Measurement Value of the SPRS In the Embodiment 1, the V-UE relative positioning scenario from vehicle-to-vehicle based on the RSS is shown in FIG. 7. Here, the multiplexing mode of SPRS signals (for example, the SPRS1 and SPRS2 described above) between different V-UEs is TDM, and may be configured by protocol predefinition.

The method for V-UE1 to send an SPRS includes:

Step 1: obtaining the SPRS2 resource configuration information sent by V-UE1 on the Sidelink through protocol predefinition. The configuration information includes an SPRS2 resource set, SPRS2 resources, an SPRS2 time domain structure, an SPRS2 frequency domain structure, and a sequence number n of a slot for transmitting the SPRS2 to other V-UE2, where the SPRS2 resource set contains one SPRS2 resource, the SPRS2 resource contains two OFDM symbols, the Comb factor is 2, the SPRS2 time domain structure uses Type A shown in FIG. 4A, and the SPRS2 frequency domain structure uses Pattern Type A shown in FIG. 5;

Step 2: V-UE1 sends an SPRS2 signal to V-UE2 in Slot #n, so that V-UE2 performs the positioning measurement based on this signal and calculates the relative distance information from V-UE1 to V-UE2.

The method for V-UE1 to receive an SPRS includes:

Step 1: obtaining the SPRS1 resource configuration information received by V-UE1 from V-UE2 on the Sidelink through protocol predefinition, where the configuration information includes an SPRS1 resource set, SPRS1 resources, an SPRS1 time domain structure, an SPRS1 frequency domain structure, and a sequence number m of a slot for receiving the SPRS1 from V-UE2;

Step 2: V-UE1 receives the SPRS1 signal sent by V-UE2 in Slot #m;

Step 3: V-UE1 measures the SPRS1 signal to obtain a positioning measurement value RSS;

Step 4: V-UE1 calculates the relative distance information from V-UE2 to V-UE1 according to the above positioning measurement value RSS and the path loss model that is pre-configured or estimated in real time.

In the same way, the SPRS transmitting and receiving methods of V-UE2 adopt the same operations as those of V-UE1. The difference is that V-UE2 receives the SPRS2 signal sent by V-UE1 in Slot #n; and V-UE2 sends the SPRS1 signal to V-UE1 in slot #m.

Embodiment 2: The Relative Positioning Based on the TOA Measurement Value of the SPRS In the Embodiment 2, the relative positioning scenario from vehicle-to-vehicle based on the TOA is shown in FIG. 7. Here, the SPRS signals (for example: the SPRS1 and SPRS2 described above) between different V-UEs are multiplexed by TDM, which may be configured by broadcast signaling, DCI signaling or positioning dedicated signaling issued by the serving base station of the Uu port.

The method for V-UE1 to send an SPRS includes followings.

Step 1: obtaining the SPRS2 resource configuration information sent by V-UE1 on the Sidelink through signaling.

Here, the configuration information includes an SPRS2 resource set, SPRS2 resources, an SPRS2 time domain structure, an SPRS2 frequency domain structure, and a sequence number n of a slot for transmitting the SPRS2 to other V-UE2, where the SPRS2 resource set contains one SPRS2 resource, the SPRS2 resource contains two OFDM symbols, the Comb factor is 2, the SPRS2 time domain structure uses Type B shown in FIG. 4B, and the SPRS2 frequency domain structure uses Pattern Type A shown in FIG. 5.

The signaling may be broadcast signaling, DCI signaling or positioning dedicated signaling issued from the serving base station of the Uu radio link.

Step 2: V-UE1 sends an SPRS2 signal to V-UE2 in Slot #n, so that V-UE2 performs the TOA positioning measurement based on this signal and calculates the relative distance information from V-UE1 to V-UE2.

The method for V-UE1 to receive an SPRS includes followings.

Step 1: obtaining the SPRS1 resource configuration information received by V-UE1 from V-UE2 on the Sidelink through signaling.

Here, the configuration information includes an SPRS1 resource set, SPRS1 resources, an SPRS1 time domain structure, an SPRS1 frequency domain structure, and a sequence number m of a slot for receiving the SPRS1 from V-UE2.

The signaling may be broadcast signaling, DCI signaling or positioning dedicated signaling issued from the serving base station of Uu port.

Step 2: V-UE1 receives the SPRS1 signal sent by V-UE2 in Slot #m.

Step 3: V-UE1 measures the SPRS1 signal to obtain a positioning measurement value TOA.

Step 4: V-UE1 calculates the relative distance information from V-UE2 to V-UE1 according to the above positioning measurement value TOA.

In the same way, the transmitting and receiving methods of V-UE2 adopt the same operations as those of V-UE1. The difference is that V-UE2 receives the SPRS2 signal sent by V-UE1 in Slot #n; and V-UE2 sends the SPRS1 signal to V-UE1 in slot #m.

Embodiment 3: The Relative Positioning Based on TOA+AoA Measurement Values of the SPRS In the Embodiment 3, the relative positioning scenario from vehicle-to-vehicle based on TOA+AoA is shown in FIG. 7. Here, the SPRS signals (for example: the SPRS1 and SPRS2 described above) between different V-UEs are multiplexed by TDM, which may be configured by the positioning dedicated signaling of PC5 protocol.

The method for V-UE1 to send an SPRS includes followings.

Step 1: obtaining the SPRS2 resource configuration information sent by V-UE1 on the Sidelink through signaling.

The configuration information includes an SPRS2 resource set, SPRS2 resources, an SPRS2 time domain structure, an SPRS2 frequency domain structure, and a sequence number n of a slot for transmitting the SPRS2 to other V-UE2, where the SPRS2 resource set contains one SPRS2 resource, the SPRS2 resource contains two OFDM symbols, the Comb factor is 2, the SPRS2 time domain structure uses Type B shown in FIG. 4B, and the SPRS2 frequency domain structure uses Pattern Type B shown in FIG. 6.

The signaling may be the positioning dedicated signaling from the PC5 protocol.

Step 2: V-UE1 sends an SPRS2 signal to V-UE2 in Slot #n, so that V-UE2 performs the TOA+AoA positioning measurement based on this signal and calculates the relative distance information from V-UE1 to V-UE2.

The method for V-UE1 to receive an SPRS includes followings.

Step 1: obtaining the SPRS1 resource configuration information received by V-UE1 from V-UE2 on the Sidelink through signaling.

Here, the configuration information includes an SPRS1 resource set, SPRS1 resources, an SPRS1 time domain structure, an SPRS1 frequency domain structure, and a sequence number m of a slot for receiving the SPRS1 from V-UE2.

The signaling may be the positioning dedicated signaling from the PC5 protocol.

Step 2: V-UE1 receives the SPRS1 signal sent by V-UE2 in Slot #m.

Step 3: V-UE1 measures the SPRS1 signal to obtain the positioning measurement values TOA and AoA.

Step 4: V-UE1 calculates the relative distance information from V-UE2 to V-UE1 according to the above positioning measurement values TOA and AoA.

In the same way, the transmitting and receiving methods of V-UE2 adopt the same operations as those of V-UE1. The difference is that V-UE2 receives the SPRS2 signal sent by V-UE1 in Slot #n; and V-UE2 sends the SPRS1 signal to V-UE1 in slot #m.

In summary, the embodiments of the present application proposes a method for transmitting and receiving an SPRS signal based on Sidelink, so as to locate the UE location of Sidelink.

Compared with the existing Sidelink case that the DMRS can only coexist with data, the CSI-RS depends on the configuration, and these two signals cannot be sent periodically as general positioning reference signals; the SPRS signal proposed in the embodiments of the present application can be sent periodically, and the transmitting moment is independent of whether to send data or not, so that the positioning requirement can be satisfied.

Compared with the existing Sidelink case that the SSB exists in a separate slot and the bandwidth is limited, which leads to the problem that the accuracy of the positioning measurement value cannot meet the requirement; the frequency domain bandwidth of the SPRS signal proposed in the embodiments of the present application is configurable, and the maximum value is the maximum system bandwidth of Sidelink, so the accuracy of the positioning measurement value can be satisfied.

Figure 8:
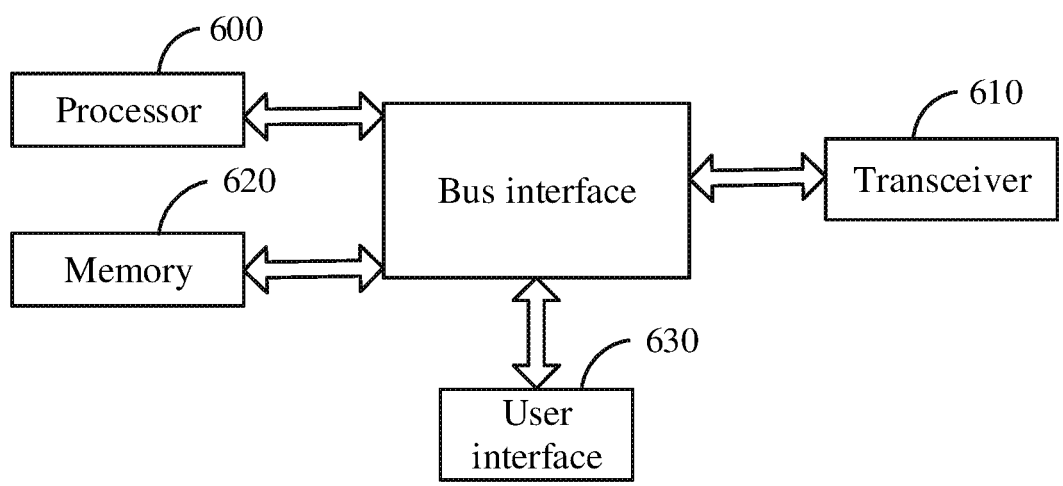
FIG. 8 is a structural schematic diagram of a signal communication device according to an embodiment of the present application.

Referring to FIG. 8, a signal communication device provided in an embodiment of the present application includes:
a memory 620 configured to store program instructions;
a processor 600 configured to invoke program instructions stored in the memory, and perform any one of the methods provided in the embodiments of the present application in accordance with the obtained program.

Specifically, if the signal communication device is configured to send SPRS signals, the processor 600 is configured to:
determine the SPRS resource configuration information of a first terminal on a Sidelink;
send an SPRS to a second terminal through the Sidelink according to the SPRS resource configuration information, so that the second terminal performs a positioning measurement based on the SPRS.

Optionally, the SPRS resource configuration information includes one or a combination of:
an SPRS resource set, SPRS resources, an SPRS time domain structure, an SPRS frequency domain structure, and a sequence number of a slot for transmitting the SPRS to the second terminal.

Specifically, if the signal communication device is configured to receive SPRS signals, the processor 600 is configured to:
determine the SPRS resource configuration information of a first terminal on a Sidelink, where the SPRS resource configuration information is sent by a second terminal;
receive an SPRS sent by the second terminal through the Sidelink according to the SPRS resource configuration information.

Optionally, the processor 600 is further configured to:
measure the SPRS to obtain a positioning measurement value;
determine the relative distance information from the second terminal to the first terminal according to the positioning measurement value.

Optionally, the SPRS resource configuration information includes one or a combination of:
an SPRS resource set, SPRS resources, an SPRS time domain structure, an SPRS frequency domain structure, and a sequence number of a slot for receiving the SPRS sent by the second terminal.

Optionally, the SPRS resource set has at least one of following characteristics:
the SPRS resource set contains at least one SPRS resource, and all SPRS resources in the SPRS resource set are associated with an antenna array of a same terminal;
for new radio frequency bands FR1 and FR2, an identifier of each SPRS resource in the SPRS resource set is associated with an antenna array of a terminal.

Optionally, the SPRS resources have at least one of following characteristics:
a comb factor Comb-N resource unit pattern of each of the SPRS resources is used to map an SPRS sequence to an RE in frequency domain;
the SPRS resource is described by at least one of: SPRS resource ID, sequence ID, Comb-N value, RE offset, initial slot index and symbol index of the SPRS resource, a quantity of symbols of each SPRS resource, and quasi co-location information of SSB;
the quantity of symbols of the SPRS resource is predefined by protocol or pre-configured on a network side;

the Comb-N value of the SPRS resource is pre-defined by protocol or pre-configured on a network side.

Optionally, the SPRS time domain structure supports two SPRS time domain structures as follows:
- a single slot structure: AGC, SPRS and GP are placed in sequence from front to back in each slot;
- a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:
- a first frequency domain structure: a plurality of continuous REs occupy a full bandwidth, and different SPRS resources are distinguished by a comb pattern of REs at equal interval;
- a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value is a maximum system bandwidth of the Sidelink.

Optionally, the SPRS resource configuration information is pre-defined by protocol or determined by signaling; where the signaling includes one or a combination of:
broadcast signaling issued from a serving base station, DCI signaling, positioning dedicated signaling defined by Uu protocol of NR wireless air interface, and positioning dedicated signaling of Proximity Communication Port PC5 protocol.

A transceiver 610 is configured to receive and send the data under the control of the processor 600.

Here, in FIG. 8, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipments, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Optionally, the processor 600 may be Central Processing Unit (CPU), Application Specific Integrated Circuit (ASIC), Field-Programmable Gate Array (FPGA) or Complex Programmable Logic Device (CPLD).

Any device provided in the embodiments of the present application may be any type of terminal, and the terminal may have both the functions of transmitting and receiving SPRS signals.

Figure 9:
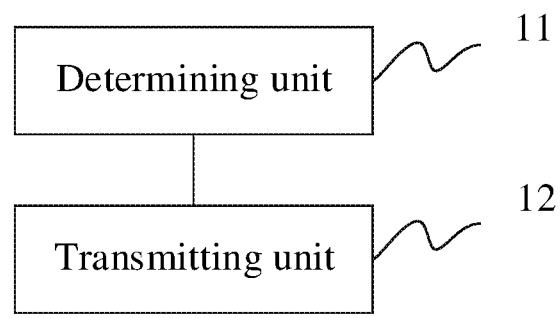
FIG. 9 is a structural schematic diagram of a signal transmitting device according to an embodiment of the present application.

Referring to FIG. 9, a signal transmitting device provided in an embodiment of the present application includes:
- a determining unit 11 configured to determine SPRS resource configuration information of a first terminal on a Sidelink;
- a transmitting unit 12 configured to send an SPRS to a second terminal through the Sidelink according to the SPRS resource configuration information, so that the second terminal performs a positioning measurement based on the SPRS.

Optionally, the SPRS resource configuration information includes one or a combination of:
an SPRS resource set, SPRS resources, an SPRS time domain structure, an SPRS frequency domain structure, and a sequence number of a slot for transmitting the SPRS to the second terminal.

Optionally, the SPRS resource set has at least one of following characteristics:
the SPRS resource set contains at least one SPRS resource, and all SPRS resources in the SPRS resource set are associated with an antenna array of a same terminal;
for new radio frequency bands FR1 and FR2, an identifier of each SPRS resource in the SPRS resource set is associated with an antenna array of a terminal.

Optionally, the SPRS resources have at least one of following characteristics:
a comb factor Comb-N resource unit pattern of each of the SPRS resources is used to map an SPRS sequence to an RE in frequency domain;
the SPRS resource is described by at least one of: SPRS resource ID, sequence ID, Comb-N value, RE offset, initial slot index and symbol index of the SPRS resource, a quantity of symbols of each SPRS resource, and quasi co-location information of SSB;
the quantity of symbols of the SPRS resource is pre-defined by protocol or pre-configured on a network side;
the Comb-N value of the SPRS resource is pre-defined by protocol or pre-configured on a network side.

Optionally, the SPRS time domain structure supports two SPRS time domain structures as follows:
- a single slot structure: AGC, SPRS and GP are placed in sequence from front to back in each slot;
- a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:
- a first frequency domain structure: a plurality of continuous REs occupy a full bandwidth, and different SPRS resources are distinguished by a comb pattern of REs at equal interval;

a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value is a maximum system bandwidth of the Sidelink.

Optionally, the SPRS resource configuration information is pre-defined by protocol or determined by signaling; where the signaling includes one or a combination of:
broadcast signaling issued from a serving base station, DCI signaling, positioning dedicated signaling defined by Uu protocol of NR wireless air interface, and positioning dedicated signaling of Proximity Communication Port PC5 protocol.

Figure 10:
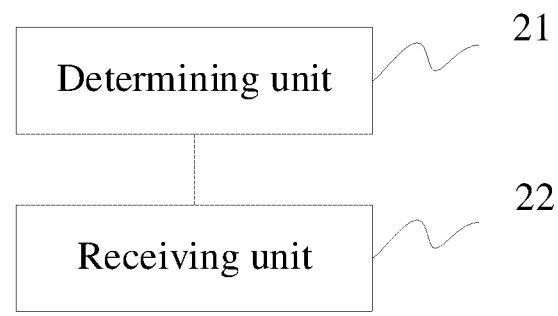
FIG. 10 is a structural schematic diagram of a signal receiving device according to an embodiment of the present application.

Referring to FIG. 10, a signal receiving device provided in an embodiment of the present application includes:
a determining unit 21 configured to determine SPRS resource configuration information of a first terminal on a Sidelink, where the SPRS resource configuration information is sent by a second terminal;
a receiving unit 22 configured to receive an SPRS sent by the second terminal through the Sidelink according to the SPRS resource configuration information.

Optionally, the determining unit 21 is further configured to:
measure the SPRS to obtain a positioning measurement value;
determine relative distance information from the second terminal to the first terminal according to the positioning measurement value.

Optionally, the SPRS resource configuration information includes one or a combination of:
an SPRS resource set, SPRS resources, an SPRS time domain structure, an SPRS frequency domain structure, and a sequence number of a slot for receiving the SPRS sent by the second terminal.

Optionally, the SPRS resource set has at least one of following characteristics:
the SPRS resource set contains at least one SPRS resource, and all SPRS resources in the SPRS resource set are associated with an antenna array of a same terminal;
for new radio frequency bands FR1 and FR2, an identifier of each SPRS resource in the SPRS resource set is associated with an antenna array of a terminal.

Optionally, the SPRS resources have at least one of following characteristics:
a comb factor Comb-N resource unit pattern of each of the SPRS resources is used to map an SPRS sequence to an RE in frequency domain;
the SPRS resource is described by at least one of: SPRS resource ID, sequence ID, Comb-N value, RE offset, initial slot index and symbol index of the SPRS resource, a quantity of symbols of each SPRS resource, and quasi co-location information of SSB;
the quantity of symbols of the SPRS resource is pre-defined by protocol or pre-configured on a network side;
the Comb-N value of the SPRS resource is pre-defined by protocol or pre-configured on a network side.

Optionally, the SPRS time domain structure supports two SPRS time domain structures as follows:
a single slot structure: AGC, SPRS and GP are placed in sequence from front to back in each slot;
a slot bundling structure: AGC, SPRS and GP are placed in sequence from front to back in a plurality of continuous slots.

Optionally, the slot bundling structure is used by a terminal to send an SPRS continuously in a broadcast mode.

Optionally, in the SPRS time domain structure, a quantity and locations of OFDM symbols occupied by the SPRS in time domain are predefined by protocol or configured on a network side.

Optionally, the SPRS frequency domain structure supports two SPRS frequency domain structures as follows:
a first frequency domain structure: a plurality of continuous REs occupy a full bandwidth, and different SPRS resources are distinguished by a comb pattern of REs at equal interval;
a second frequency domain structure: the full bandwidth is divided into a plurality of different continuous sub-bands, and different SPRS resources occupy different sub-bands.

Optionally, in the first frequency domain structure, a comb factor in frequency domain is predefined by protocol or configured on a network side, and different SPRS resources are mapped to different transmitting antenna arrays.

Optionally, the SPRS frequency domain structure supports a fixed RE pattern and a frequency hopping RE pattern.

Optionally, an SPRS frequency domain bandwidth in the SPRS frequency domain structure is pre-defined by protocol or configured on a network side, and a maximum value is a maximum system bandwidth of the Sidelink.

Optionally, the SPRS resource configuration information is pre-defined by protocol or determined by signaling; where the signaling includes one or a combination of:
broadcast signaling issued from a serving base station, DCI signaling, positioning dedicated signaling defined by Uu protocol of NR wireless air interface, and positioning dedicated signaling of Proximity Communication Port PC5 protocol.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the technical solution of the present application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA), etc. The computing device may include a CPU, a memory, input/output devices, etc. The input device may include a keyboard, a mouse, a touch screen, etc., and the output device may include a display device such as Liquid Crystal Display (LCD), Cathode Ray Tube (CRT), etc.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A data transmitting method, comprises:
   determining a Sidelink Positioning Reference Signal, SPRS, resource configuration information of a first terminal on a Sidelink;
   transmitting an SPRS to a second terminal through the Sidelink according to the SPRS resource configuration information, wherein the SPRS is used for the second terminal to perform a positioning measurement;
   wherein the SPRS resource configuration information comprises an SPRS frequency domain structure;
   wherein the SPRS frequency domain structure comprises:
   a plurality of continuous REs occupying a full bandwidth, and different SPRS resources being distinguished by a comb pattern of REs at equal interval.

2. The method according to claim 1, wherein the SPRS resource configuration information comprises one or a combination of:
   an SPRS resource set, SPRS resources, an SPRS time domain structure, or a sequence number of a slot for transmitting the SPRS to the second terminal.

3. The method according to claim 2, wherein the SPRS resource set comprises at least one of following characteristics:
   the SPRS resource set comprises at least one SPRS resource, and all SPRS resources in the SPRS resource set are associated with an antenna array of a same terminal, or
   for new radio frequency bands FR1 and FR2, an identifier of each SPRS resource in the SPRS resource set is associated with an antenna array of a terminal, or
   wherein the SPRS resources comprise at least one of following characteristics:
   a comb factor Comb-N resource unit pattern of each of the SPRS resources is used to map an SPRS sequence to Resource Element, REs, in frequency domain;
   the SPRS resource is described by at least one of: an SPRS resource ID, a sequence ID, a Comb-N value, a RE offset, an initial slot index and symbol index of the SPRS resource, a quantity of symbols of each SPRS resource, or a quasi co-location information of Synchronization Block/PBCH, SSB;
the quantity of symbols of the SPRS resource is predefined by protocol or pre-configured on a network side, or
the Comb-N value of the SPRS resource is pre-defined by protocol or pre-configured on a network side.

4. The method according to claim 2, wherein the SPRS time domain structure supports two SPRS time domain structures as follows:
a single slot structure: Automatic Gain Control, AGC; SPRS; and Guard Period, GP, are placed in sequence from front to back in each slot;
a slot bundling structure: AGC, SPRS and GP are placed in sequence from front to back in a plurality of continuous slots.

5. The method according to claim 4, wherein the slot bundling structure is used by a terminal to transmit an SPRS continuously in a broadcast mode,
or
wherein in the SPRS time domain structure, a quantity and locations of OFDM symbols occupied by the SPRS in time domain are predefined by protocol or configured on a network side.

6. The method according to claim 1, wherein in the first frequency domain structure, a comb factor in frequency domain is predefined by protocol or configured on a network side, and different SPRS resources are mapped to different transmitting antenna arrays,
or
wherein the SPRS frequency domain structure supports a fixed RE pattern and a frequency hopping RE pattern.

7. The method according to claim 1, wherein an SPRS frequency domain bandwidth in the SPRS frequency domain structure is pre-defined by protocol or configured on a network side, and a maximum value of the SPRS frequency domain bandwidth is a maximum system bandwidth of the Sidelink.

8. The method according to claim 1, wherein the SPRS resource configuration information is pre-defined by protocol or determined by signaling; wherein the signaling comprises one or a combination of:
a broadcast signaling issued from a serving base station, a Downlink Control Information, DCI, signaling, a positioning dedicated signaling defined by Uu protocol of NR wireless air interface, or a positioning dedicated signaling of Proximity Communication Port PC5 protocol.

9. A signal transmitting device, comprises:
a memory configured to store program instructions;
a processor configured to invoke the program instructions stored in the memory to perform the method of claim 1.

10. A signal receiving method, comprises:
determining a Sidelink Positioning Reference Signal, SPRS, resource configuration information of a first terminal on a Sidelink, wherein the SPRS resource configuration information is transmitted by a second terminal;
receiving an SPRS transmitted by the second terminal through the Sidelink according to the SPRS resource configuration information;
wherein the SPRS resource configuration information comprises an SPRS frequency domain structure;
wherein the SPRS frequency domain structure comprises:
a plurality of continuous REs occupying a full bandwidth, and different SPRS resources being distinguished by a comb pattern of REs at equal interval.

11. The method according to claim 10, further comprises:
measuring the SPRS to obtain a positioning measurement value;
determining relative distance information from the second terminal to the first terminal according to the positioning measurement value.

12. The method according to claim 10, wherein the SPRS resource configuration information comprises one or a combination of:
an SPRS resource set, SPRS resources, an SPRS time domain structure, or a sequence number of a slot for receiving the SPRS transmitted by the second terminal.

13. The method according to claim 12, wherein the SPRS resource set comprises at least one of following characteristics:
the SPRS resource set comprises at least one SPRS resource, and all SPRS resources in the SPRS resource set are associated with an antenna array of a same terminal, or
for new radio frequency bands FR1 and FR2, an identifier of each SPRS resource in the SPRS resource set is associated with an antenna array of a terminal,
or
wherein the SPRS resources comprise at least one of following characteristics:
a comb factor Comb-N resource unit pattern of each of the SPRS resources is used to map an SPRS sequence to Resource Elements, REs, in frequency domain;
the SPRS resource is described by at least one of: an SPRS resource ID, a sequence ID, a Comb-N value, a RE offset, an initial slot index and symbol index of the SPRS resource, a quantity of symbols of each SPRS resource, or a quasi co-location information of Synchronization Block/PBCH, SSB;
the quantity of symbols of the SPRS resource is predefined by protocol or pre-configured on a network side, or
the Comb-N value of the SPRS resource is pre-defined by protocol or pre-configured on a network side.

14. The method according to claim 12, wherein the SPRS time domain structure supports two SPRS time domain structures as follows:
a single slot structure: AGC, SPRS and GP are placed in sequence from front to back in each slot;
a slot bundling structure: AGC, SPRS and GP are placed in sequence from front to back in a plurality of continuous slots.

15. The method according to claim 14, wherein the slot bundling structure is used by a terminal to transmit an SPRS continuously in a broadcast mode,
or
in the SPRS time domain structure, a quantity and locations of OFDM symbols occupied by the SPRS in time domain are predefined by protocol or configured on a network side.

16. The method according to claim 10, wherein in the first frequency domain structure, a comb factor in frequency domain is predefined by protocol or configured on a network side, and different SPRS resources are mapped to different transmitting antenna arrays.

17. The method of claim 10, wherein the SPRS frequency domain structure supports a fixed RE pattern and a frequency hopping RE pattern.

18. The method according to claim 10, wherein an SPRS frequency domain bandwidth in the SPRS frequency domain structure is pre-defined by protocol or configured on a network side, and a maximum value of the SPRS frequency domain bandwidth is a maximum system bandwidth of the Sidelink.

19. The method according to claim 10, wherein the SPRS resource configuration information is pre-defined by protocol or determined by signaling; wherein the signaling comprises one or a combination of:
   a broadcast signaling issued from a serving base station, a Downlink Control Information, DCI, signaling, a positioning dedicated signaling defined by Uu protocol of NR wireless air interface, or a positioning dedicated signaling of Proximity Communication Port PC5 protocol.

20. A signal receiving device, comprises:
   a memory configured to store program instructions;
   a processor configured to invoke the program instructions stored in the memory to perform the method of claim 10.

* * * * *